United States Patent
King, Jr.

(10) Patent No.: US 9,981,214 B2
(45) Date of Patent: May 29, 2018

(54) SYSTEM AND METHOD FOR BACKFLUSHING A VACUUM FILTER

(71) Applicant: Skitter & Squirt Adventures, LLC, Missoula, MT (US)

(72) Inventor: Jack M. King, Jr., Phoenix, AZ (US)

(73) Assignee: Skitter & Squirt Adventures, LLC, Missoula, MT (US)

(*) Notice: Subject to any disclaimer, the term of this patent is extended or adjusted under 35 U.S.C. 154(b) by 0 days. days.

(21) Appl. No.: 15/381,233

(22) Filed: Dec. 16, 2016

(65) Prior Publication Data

US 2017/0151524 A1 Jun. 1, 2017

(51) Int. Cl.
*B01D 46/00* (2006.01)
*A47L 9/20* (2006.01)
*B01D 46/42* (2006.01)

(52) U.S. Cl.
CPC ............ *B01D 46/0068* (2013.01); *A47L 9/20* (2013.01); *B01D 46/002* (2013.01); *B01D 46/4272* (2013.01); *B01D 2277/10* (2013.01); *B01D 2279/55* (2013.01)

(58) Field of Classification Search
CPC .. B01D 46/00; B01D 46/0017; B01D 46/002; B01D 46/0068; B01D 46/4272; B01D 2277/10; B01D 2279/55; A47L 9/20
USPC .......................................................... 95/279
See application file for complete search history.

(56) References Cited

U.S. PATENT DOCUMENTS

| | | |
|---|---|---|
| 4,214,882 A | 7/1980 | Brenholt |
| 4,298,360 A | 11/1981 | Poll |
| 4,826,512 A | 5/1989 | Fuller |
| 5,616,171 A | 4/1997 | Barris |
| 6,638,344 B2 | 10/2003 | Horton |
| 6,676,721 B1 | 1/2004 | Gillingham |
| 7,082,640 B2 | 8/2006 | McCutchen |
| 7,517,376 B2 | 4/2009 | MsCausland |
| 7,879,248 B2 | 2/2011 | Svetlik, III |
| 8,327,487 B2 | 12/2012 | Kunz |
| 8,382,870 B2 | 2/2013 | Troxell |

(Continued)

OTHER PUBLICATIONS

Sizto Tech Corporation, Solenoid Valve Specification and Dimensions: 2P160-250 & 2PO160-250, Aug. 31, 2016, https://www.stcvalve.com/Solenoid_Valve_Specifications_2P160-250_htm.

(Continued)

*Primary Examiner* — T. Bennett McKenzie
(74) *Attorney, Agent, or Firm* — Lisa Foundation Patent Law Clinic at Arizona State University

(57) ABSTRACT

A vacuum filter backflushing system having an air recapturing adapter coupled to a vacuum motor's air exhaust port which recaptures a portion of exhaust air and introduces the air into a recaptured air passage. The recaptured air passage is coupled to an air flow director which is configured to direct air to an air filter. The air flow director is configured to selectively prevent air from flowing through the filters in a normal air flow direction and allow the air in the recaptured air passage to backflush the filter by dislodging particles from air filter media. The recaptured air passage can terminate after a last air filter, such that the recaptured air passage is pressurized, or the recaptured air passage can recouple back into the air exhaust port or the air recapturing adapter, such that the air is in constant motion in the recaptured air passage.

10 Claims, 8 Drawing Sheets

(56) References Cited

U.S. PATENT DOCUMENTS

| | | |
|---|---|---|
| 8,695,157 B2 | 4/2014 | Beskow |
| 8,864,913 B2 | 10/2014 | Haynam |
| 8,876,928 B2 | 11/2014 | Szczap |
| 2003/0041729 A1 | 3/2003 | Finigan |
| 2013/0255030 A1* | 10/2013 | Meredith ................ A47L 5/365 15/347 |
| 2013/0255050 A1* | 10/2013 | Thomas .................. B25B 27/20 29/229 |
| 2014/0237763 A1 | 8/2014 | Holsten |

OTHER PUBLICATIONS

Industrial Contractors Supplies, Dust Director Pulse'n Shake Vacuums, Last Accessed: Dec. 2, 2016, http://icscompany.net/PulseNshake_Auto_vac_menu_htm.

* cited by examiner

SYSTEM AND METHOD FOR BACKFLUSHING A VACUUM FILTER

BACKGROUND

1. Field of the Invention

Embodiments of the subject matter described herein relate generally to vacuums and vacuum filters. More particularly, embodiments of the subject matter described herein relate to a system and method of backflushing vacuum filters.

2. Description of Related Art

A vacuum is largely limited by its ability to filter out the debris that is being received into the vacuum and the clean air that it is able to expel. In settings where large amounts of debris are being taken into the vacuum, it is necessary for the filters to efficiently separate the air from the debris. In certain industries like tile removal, as one example, large amounts of dust and debris are generated in the process of breaking up and removing tiles or other floor or wall coverings. Furthermore, once the tile has been removed, the remaining backing material and bonding agents remain on the floor or wall which are also to be removed, generally by a grinding process. Because of the amount of dust and debris this process produces, it is often necessary to prepare and protect the surrounding area from the generated dust and debris. Additionally, the health of the individuals may be affected by the debris that is released in the process. Furthermore, environmental regulations may prohibit the escape of the dust into the atmosphere.

In order to combat the dust and to improve the efficiency and efficacy of the filter units in a vacuum, various filtering arrangements and systems have been employed. However, there are significant drawbacks with these designs as they require costly, heavy, and large components to accomplish these objectives.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 8,876,928 discloses an automatic flow blocking system for reverse pulse filter cleaning. The flow blocking system has a plunger which can prevent movement of air through the air filter. A reverse pulse air filtering device is positioned to selectively remove accumulated powder from the filter.

U.S. Pat. No. 7,517,376 discloses a reverse pulse cleaning of filter elements. A pressure vessel is adapted to contain a volume of compressed air to be used for supplying a reverse pulse. The valve is mounted to the wall around the aperture to control the flow of air from the pressure vessel to the air filtering element.

U.S. Pat. No. 4,214,882 discloses an air filtering unit with pulse jets for cleaning filter elements. A valve system is connected to an inner passage for dislodging dust from the filter. The valve system is connected to a suitable source of compressed air.

U.S. Pat. No. 6,638,344 discloses a filter vent system. The clean air plenum on the downstream side of a filter is pulsed with a large burst of high pressure air from a source which raises the plenum pressure to produce a pulsed flow reversal, displacing particulate matter from the filters.

U.S. Pat. No. 8,864,913 discloses a filter cleaning system. A set of pulse nozzles and a compressed air supply rotate together and release pulse blasts to the filter at controlled intervals to clean a filter unit.

U.S. Pat. No. 4,298,360 discloses a pulsed air filter cleaning system. Rectangular channels are positioned near the air filters. The rectangular passages are supplied by a source of compressed air with pulses of air which force air through the center of the venturis and bags in a reverse direction to filter the air.

U.S. Pat. No. 5,616,171 discloses a pulse jet filter cleaning system. Pulses of air are directed at a filter arrangement and the loosened debris is swept down a single duct away from the filter.

U.S. Pat. No. 6,676,721 discloses multistage air cleaner including a pulse cleaning system. An engine air intake filter assembly having a pulse jet cleaning arrangement is constructed and arranged to selectively direct pulses of air through an air filter arrangement at a predetermined pressure drop.

U.S. Pat. No. 4,826,512 discloses a self-cleaning air filter. An air nozzle that has a narrow elongated slot is adjustably supported inside of a filter cartridge to direct air radially outward through the cartridge in order to backflush the filter cartridge when it is rotated.

U.S. Pat. No. 7,879,248 discloses filtering systems with integral filter back-flushing. The filtering system filters fluid output from the first outlet of the distribution valve during the first cycle while back-flushing a second filter. The filtering subsystem which is not being used to provide fluid to the disposal area is back-flushed to prevent clogging.

U.S. Pat. No. 8,382,870 discloses a self-cleaning air filter. The self-cleaning air filter includes a filter casing, a filter element housed within a filter casing, an electronically controlled pulse valve that releases the compressed air pulse, and a pulse pressure relief vent.

U.S. Pat. No. 8,327,487 discloses a vacuum cleaner filter device. The vacuum has a filter between a suction inlet opening and a suction device with a motor driving a device for disengaging debris from the filter.

U.S. Pat. No. 8,695,157 discloses a vacuum cleaner with filter cleaning. The vacuum forces a second air stream in a second air stream path through the filtering unit, in a second direction reverse to the first direction, to remove dust from the filtering unit.

U.S. Pat. No. 7,082,640 discloses an ambient air back-flushed vacuum filter. Ambient air is intermittently drawn into a vacuum to backflush air filters.

U.S. Patent Publication 20030041729 discloses a method and apparatus for cleaning filter bags of bag houses. Each bag is contained in a separate cell so flow can be cut off to the separate bag and gravitational migration of floaters and other suspended particles toward a hopper can occur.

U.S. Patent Publication 20140237763 discloses a backflush filter cleaning system and method of use. The vacuum can establish a second airflow path from an atmosphere surrounding the vacuum cleaner through the backflush valve, through the filter, and into the collector to clean the filter.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

The present invention provides among other things a vacuum filter backflushing system. The backflushing system includes an air recapturing adapter that redirects a portion of air from the exhaust port back into a recaptured air passage. The recaptured air passage allows for the recaptured air to be directed towards air filters. The air filters are backflushed when an air flow director is oriented such that the recaptured air moves through the air filter in a reverse direction to the normal filtering direction. The recaptured air passage can terminate after a last valve connected to a last air filter such that the recaptured air passage is pressurized, or the recaptured air passage can reconnect to the exhaust port such that the recaptured air is in constant motion.

In one embodiment, a vacuum cleaner filter backflushing system comprises a vacuum motor, an air inlet port in fluid communication with the vacuum motor, at least two air filters in fluid communication with the air inlet port and the vacuum motor and positioned between the air inlet port and the vacuum motor, an air exhaust port in fluid communication with the vacuum motor, wherein the vacuum motor is positioned between the air inlet port and the air exhaust port, and an air recapturing adapter proximate the air exhaust port, wherein the air recapturing adapter is configured to redirect a portion of exhaust air into a recaptured air passage, wherein the recaptured air passage is in fluid communication with the air recapturing adapter and the at least two air filters and an air flow director configured to direct the portion of exhaust air towards one of the at least two air filters.

A vacuum cleaner filter backflushing system which comprises a vacuum motor, an air inlet port in fluid communication with the vacuum motor, at least two air filters in fluid communication with the air inlet port and the vacuum motor and positioned between the air inlet port and the vacuum motor, an air exhaust port in fluid communication with the vacuum motor, wherein the vacuum motor is positioned between the air inlet port and the air exhaust port, and an air recapturing adapter proximate the air exhaust port, wherein the air recapturing adapter is configured to redirect a portion of exhaust air into a recaptured air passage. The recaptured air passage is in fluid communication with the air recapturing adapter and the at least two air filters; and an air flow director is configured to direct the portion of exhaust air towards one of the at least two air filters. The air flow director may comprise a first valve system corresponding to a first air filter of the at least two air filters and a second valve system corresponding to a second air filter of the at least two air filters. The first valve system may comprise a first vacuum valve opening configured to allow fluid communication between the vacuum motor and the first air filter, a first backflush valve opening configured to allow fluid communication between the recaptured air passage and the first air filter, a first vacuum valve plug configured to close the first vacuum valve opening, and a first backflush valve plug configured to close the first backflush valve opening. The second valve system may comprise a second vacuum valve opening configured to allow fluid communication between the vacuum motor and the second air filter, a second backflush valve opening configured to allow fluid communication between the recaptured air passage and the second air filter, a second vacuum valve plug configured to close the second vacuum valve opening, and a second backflush valve plug configured to close the second backflush valve opening.

The first valve system and the second valve system may be configured to be oriented in a normal flow orientation, wherein the first backflush valve plug is in contact with the first backflush valve opening so that the first backflush valve opening is sealed shut and the first vacuum valve plug is positioned distal from the first vacuum valve opening so that the first vacuum valve opening allows fluid communication between the vacuum motor and the first air filter when in the normal flow orientation, and the second backflush valve plug is in contact with the second backflush valve opening so that the second backflush valve opening is sealed shut and the second vacuum valve plug is positioned distal from the second vacuum valve opening so that the second vacuum valve opening allows fluid communication between the vacuum motor and the second air filter when in the normal flow orientation. The first valve system may be configured to be intermittently oriented in a backflushing orientation, wherein the first vacuum valve plug is in contact with the first vacuum valve opening so that the first vacuum valve opening is sealed shut and the first backflush valve plug is positioned distal from the first backflush valve opening and the first backflush valve opening maintains fluid communication between the recaptured air passage and the first air filter when in the backflushing orientation. The second valve system may be configured to be intermittently oriented in a backflushing orientation, wherein the second vacuum valve plug is in contact with the second vacuum valve opening so that the second vacuum valve opening is sealed shut and the second backflush valve plug is positioned distal from the second backflush valve opening and the second backflush valve opening maintains fluid communication between the recaptured air passage and the second air filter when in the backflushing orientation.

The first valve system and the second valve system may be configured to intermittently be oriented in a backflushing orientation, wherein, when the first valve system is in the backflushing orientation, the first vacuum valve plug is in contact with the first vacuum valve opening so that the first vacuum valve opening is sealed shut and the first backflush valve plug is positioned distal from the first backflush valve opening and the first backflush valve opening maintains fluid communication between the recaptured air passage and the first air filter when in the backflushing orientation, and the second valve system is in the normal flow orientation. When the second valve system is in the backflushing orientation, the second vacuum valve plug is in contact with the second vacuum valve opening so that the second vacuum valve opening is sealed shut and the second backflush valve plug is positioned distal from the second backflush valve opening and the second backflush valve opening maintains fluid communication between the recaptured air passage and the second air filter when in the backflushing orientation, and the first valve system is in the normal flow orientation.

The vacuum cleaner filter backflushing system may further comprise a controller configured to intermittently position the first valve system and the second valve system between the backflushing orientation and the normal flow orientation. Furthermore, the recaptured air passage may terminate after a last valve of the valve systems. However, the recaptured air passage may be recoupled to the air exhaust port downstream from the air recapturing adapter.

A method of backflushing vacuum cleaner filters may comprise passing air in a first direction through at least two air filters, wherein a vacuum motor is configured to pull the air from an air inlet port through the at least two air filters, passing the air from the vacuum motor to an air exhaust port, recapturing a portion of the air, wherein the portion of the air is recaptured by an air recapturing adapter coupled to the air exhaust port, sending the portion of the air to the at least two air filters, wherein the portion of the air is channeled through a recaptured air passage in fluid communication with the at least two air filters, setting a first air flow director to a backflushing orientation comprising allowing the portion of the air to flow through one of the at least two air filters in a reverse direction for a portion of time, wherein the first air flow director is configured to open a passage to allow fluid communication between the recaptured air passage and the one of the at least two air filters, and returning the first air flow director to a normal flow orientation comprising reorienting the first air flow director after the portion of time, wherein the recaptured air passage and the one of the at least two air filters are not in fluid communication.

The method may comprise setting a second valve to a backflushing orientation comprising allowing the portion of the air to flow through a second air filter of the at least two air filters in the reverse direction for a second portion of time, wherein the second valve is configured to open a second passage to allow fluid communication between the recaptured air passage and the second air filter of the at least two air filters, and returning the second valve to a normal flow orientation comprising closing the second valve after the second portion of time, wherein the recaptured air passage and the second air filter of the at least two air filters are not in fluid communication. The portion of the air may be pressurized, wherein the recaptured air passage terminates after a last valve coupled to a second air filter of the at least two air filters. The portion of the air may be in constant motion, wherein the recaptured air passage recouples to the exhaust port downstream from the air recapturing adapter.

The method may further comprise sending a signal to motors coupled to the first valve and the second valve to alternate between the backflushing orientation and the normal flow orientation. Sending a signal to motors coupled to the first valve and the second valve may be automated to alternate between the backflushing orientation and the normal flow orientation at a set interval.

A vacuum cleaner filter backflushing system may comprise a vacuum motor comprising an air receiving end and an exhaust end, at least two valve systems comprising a first valve opening coupled to the air receiving end of the vacuum motor, a second valve opening, a filter opening, a shaft coupled to a first valve plug and a second valve plug, wherein the first valve plug and the second valve plug are oriented and spaced on the rod so that when the first valve plug is in contact and sealing the first valve opening, the second valve plug is positioned distal from the second valve opening and when the second valve plug is in contact and sealing the second valve opening, the first valve plug is distal from the first valve opening, at least two air filters, wherein each of the at least two air filters are coupled separately to each of the at least two valve systems at the filter opening, an air recapturing adapter coupled to the exhaust end of the vacuum motor, wherein the air recapturing adapter is configured to recapture a portion of exhaust air, and a recaptured air passage coupled to the air recapturing adapter and the second valve opening.

The vacuum cleaner backflushing system may further comprise a substantially air tight chamber comprising an air inlet port, a surrounding wall, a floor coupled to a bottom edge of the surrounding wall, wherein an upper edge of the surrounding wall is removably coupled to an upper plate so that the vacuum motor is in fluid communication with the air inlet port via the at least two air filters and the substantially air tight chamber. The substantially air tight chamber may be configured to house at least two air filters. The air inlet port may be configured to direct incoming debris away from at least two air filters.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain and ordinary English meaning to those skilled in the applicable arts as set forth above.

Further, the inventor is fully informed of the standards and application of the special provisions of post-AIA 35 U.S.C. § 112(f). Thus, the use of the words "function," "means" or "step" in the Detailed Description or Description of the Drawings or claims is not intended to somehow indicate a desire to invoke the special provisions of post-AIA 35 U.S.C. § 112(f), to define the invention. To the contrary, if the provisions of post-AIA 35 U.S.C. § 112(f) are sought to be invoked to define the inventions, the claims will specifically and expressly state the exact phrases "means for" or "step for," and will also recite the word "function" (i.e., will state "means for performing the function of [insert function]"), without also reciting in such phrases any structure, material or act in support of the function. Thus, even when the claims recite a "means for performing the function of . . . or step for performing the function of . . . ," if the claims also recite any structure, material or acts in support of that means or step, or that perform the recited function, then it is the clear intention of the inventor not to invoke the provisions of post-AIA 35 U.S.C. § 112(f). Moreover, even if the provisions of post-AIA 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Figure 1:
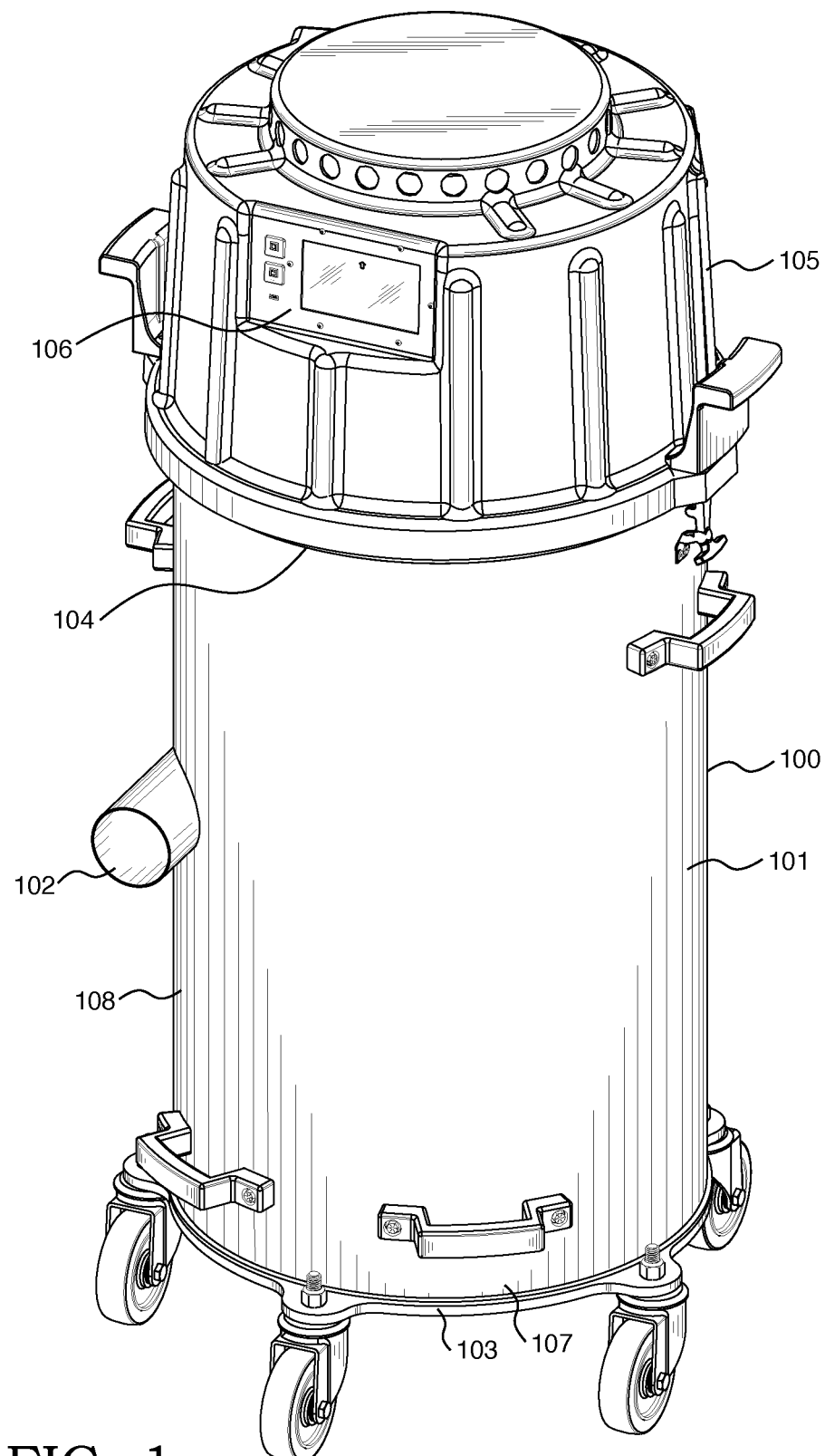
FIG. 1 depicts an implementation of a vacuum system.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In one application, a novel system and method for backflushing vacuum filters is disclosed. This is accomplished through the use of an air recapturing adapter 312 that redirects exhaust air towards a first air filter 208 and in alternate embodiments a second air filter 209, a third air filter 210, and a fourth air filter 211.

FIG. 1 illustrates an exemplary embodiment of the external unit of the vacuum system 100. In a non-limiting exemplary embodiment, a vacuum system 100 includes a surrounding wall 101, an air inlet port 102 disposed on the surrounding wall 101, a floor 103 coupled to a bottom edge 107 of the surrounding wall 101, an upper edge of the surrounding wall 104 wherein a vacuum cover 105 is removably coupled to the upper edge of the surrounding wall 104 such that a seal on the vacuum cover 105 is substantially air tight. When the vacuum system 100 is assembled together, it comprises a substantially air tight chamber 108 excluding the air inlet port 102, such that when the vacuum system 100 is active, a vacuum motor 314 creates a low pressure system in the substantially air tight chamber 108 and air is pulled in through the air inlet port 102. It can be appreciated that the vacuum system 100 of FIG. 1 is a simplified version and can be represented in many various embodiments and is not provided as a limiting example. In another embodiment, the vacuum cover 105 further comprises a controller 106. The controller 106 can be configured to control the operation of the various components of the vacuum system 100. Furthermore, the controller 106 can allow for programmed settings to be selected as to the method of operating the vacuum system 100 such as for backflushing the filters or the manual control of the various components of the vacuum system 100.

Figure 2:
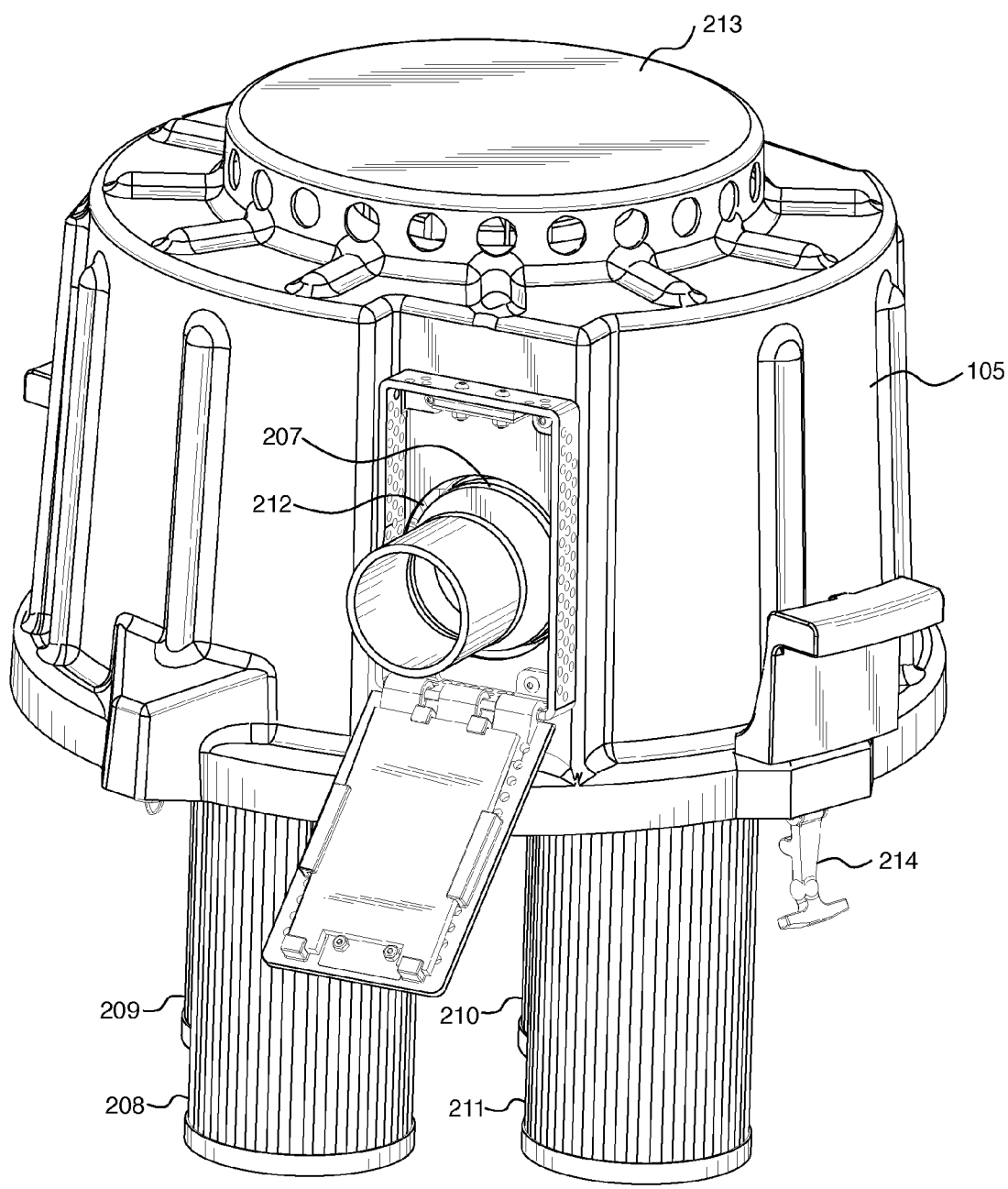
FIG. 2 depicts an implementation of a vacuum lid and filters.

FIG. 2 provides a non-limiting embodiment of the vacuum cover 105, wherein the vacuum cover 105 further comprises an air exhaust port 207. In one embodiment, the air exhaust port 207 may be directly coupled to the vacuum cover 105. In another embodiment the air exhaust port 207 passes through a passageway 212 on the vacuum cover 105. The vacuum cover 105 can also be configured to have an upper accessory surface 213, wherein the surface is configured to receive or house accessory units. In one embodiment, such accessory units may include additional filtration systems such as a HEPA filtration unit. Furthermore, the vacuum cover 105 may have one or more clamps 214 that correspond to the surrounding wall 101 which secure the vacuum cover 105 to the surrounding wall 101. An exemplary embodiment provides for a first air filter 208, a second air filter 209, a third air filter 210, and a fourth air filter 211 removably coupled to an upper plate 315, wherein the vacuum cover 105 is removably coupled to the upper plate 315.

Figure 3:
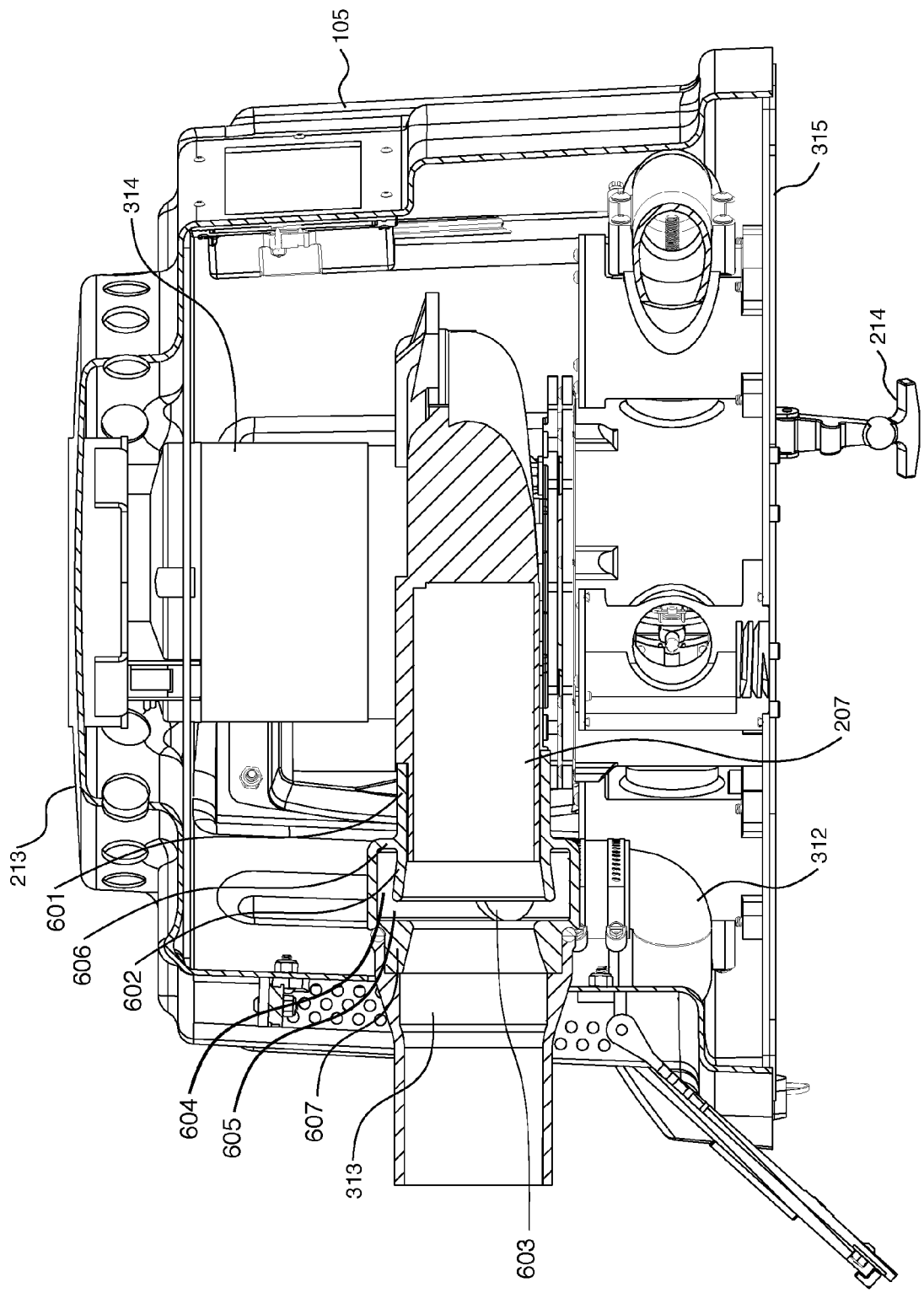
FIG. 3 depicts an implementation of a vacuum motor, air exhaust port, and air recapturing adapter.

FIG. 3 provides an exemplary embodiment of the components that provide for the backflushing of the vacuum system's 100 air filters 208, 209, 210, 211. In one embodiment a vacuum motor 314 is coupled to the upper plate 315. The vacuum motor 314 comprises an air exhaust port 207, such that air that is passing through the vacuum system 100 is exhausted through the air exhaust port 207. In another embodiment, the air recapturing adapter 313 is coupled to the air exhaust port 207 such that as air is exhausted out of the vacuum system 100, the air also passes through the air recapturing adapter 313. The air recapturing adapter 313 is in fluid communication with the recaptured air passage 312 such that when the air recapturing adapter 313 recaptures a portion of the air that is exhausted, the air passes into the recaptured air passage 312. The recaptured air is subsequently used to backflush the air filters 208, 209, 210, 211, and any other air filter to which the recaptured air passage 312 is configured to provide recaptured air for backflushing.

Figure 4:
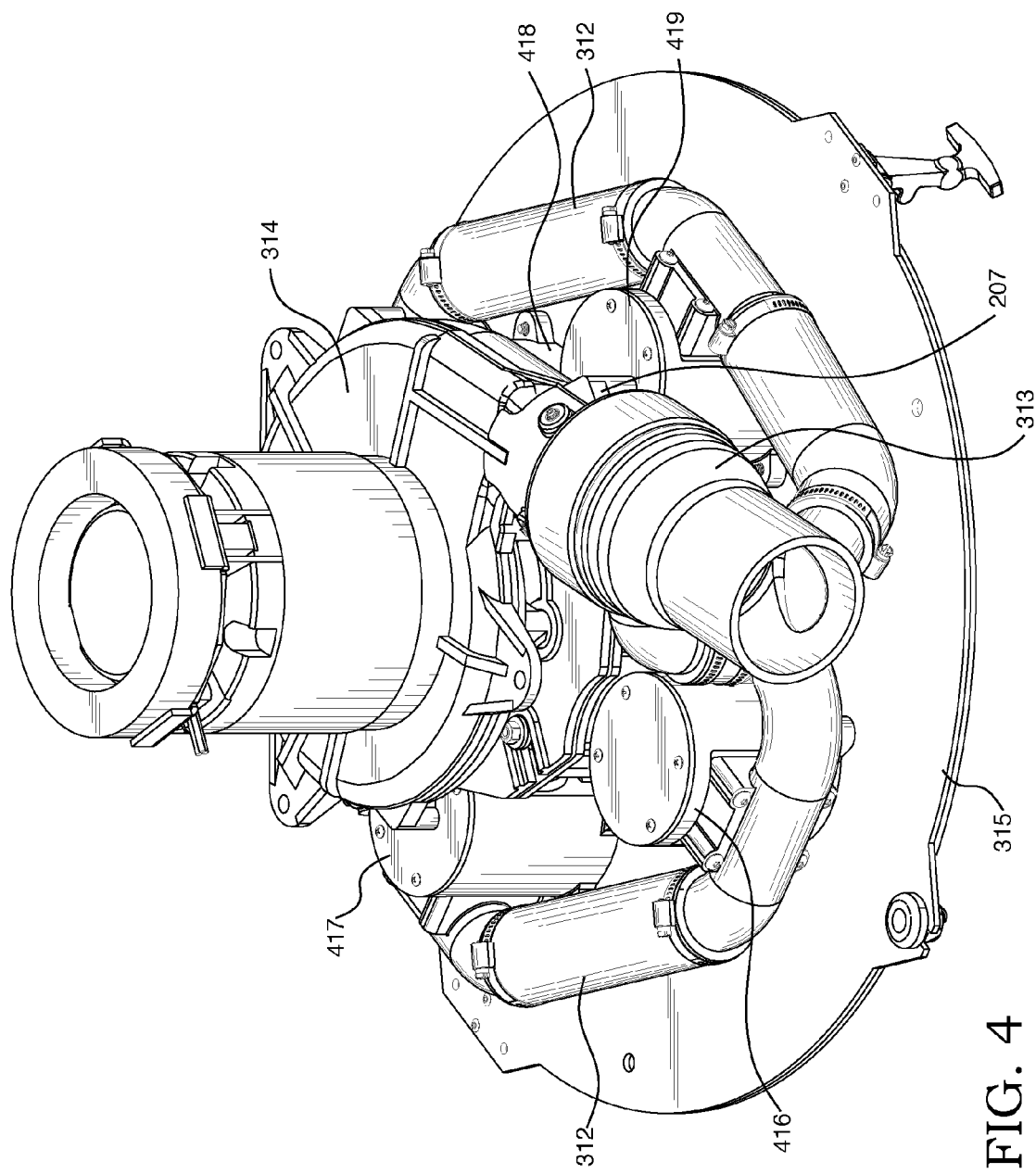
FIG. 4 depicts an implementation of a recaptured air passage, vacuum motor, air flow directors, and recaptured air port.
Figure 5:
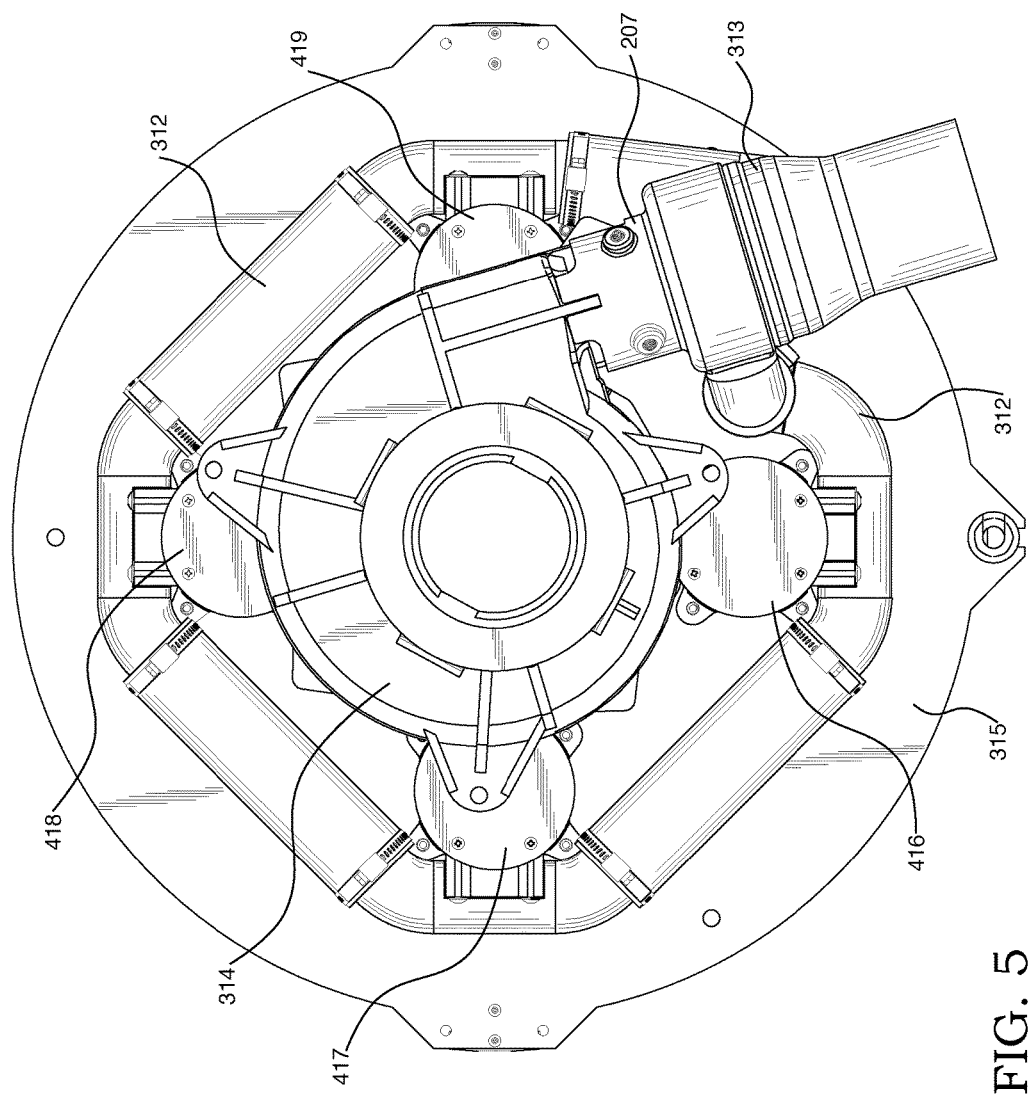
FIG. 5 depicts a top looking down view of FIG. 4.

FIGS. 4-5 demonstrate another exemplary embodiment in which the recaptured air passage 312 reconnects back into the air recapturing adapter 313. In this embodiment, the recaptured air passage 312 reconnects back into the air recapturing adapter 313 downstream from where the exhausted air is being recaptured by the air recapturing adapter 313, which keeps the recaptured air constantly flowing through the recaptured air passage 312 when air is being exhausted from the vacuum motor 314. Another embodiment may have the recaptured air passage 312 reconnecting back into the air exhaust port 207. FIG. 4 demonstrates air flow directors 416, 417, 418, 419 coupled to the recaptured air passage 312. The air flow directors 416, 417, 418, 419 are configured to provide air from the recaptured air passage 312 to each of air filters 208, 209, 210, 211, and any other air filter to which the recaptured air passage 312 is configured to provide recaptured air for backflushing.

Figure 6:
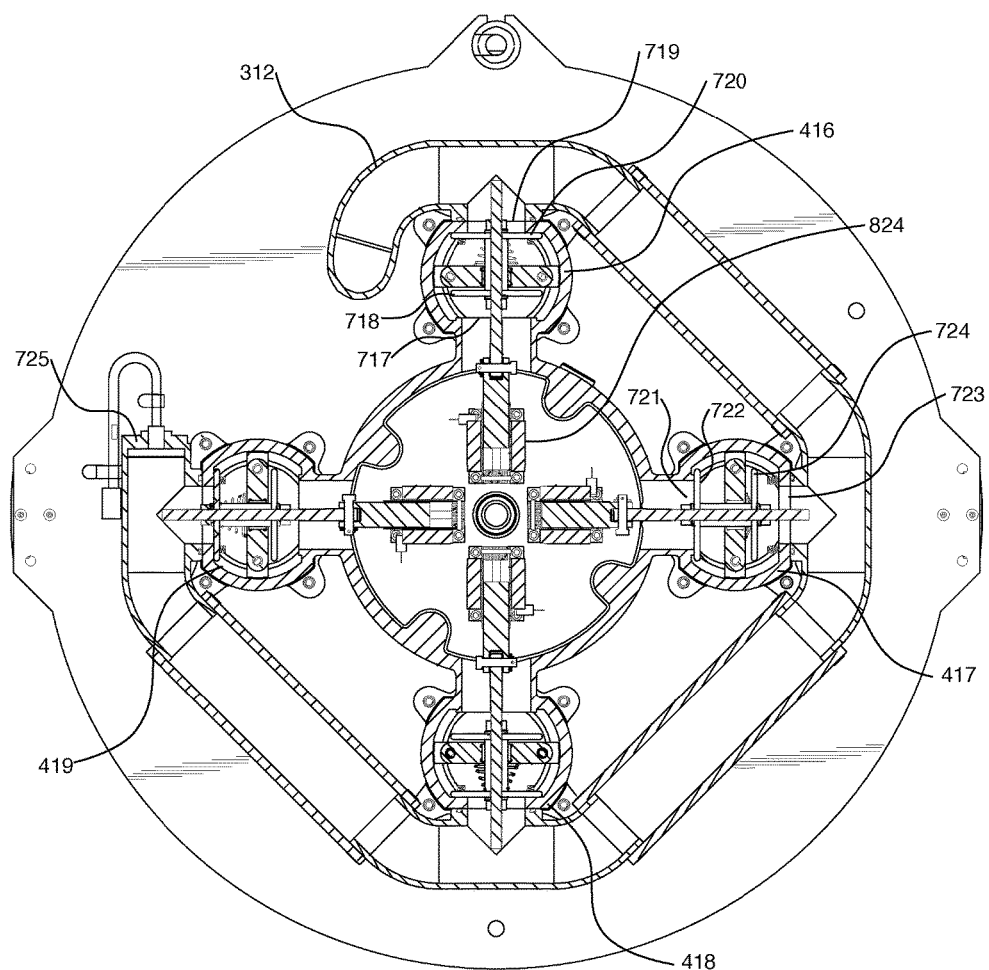
FIG. 6 depicts an implementation of a recaptured air passage and air flow directors.

FIG. 6 provides an exemplary embodiment of the air flow directors 416, 417, 418, 419. The air flow directors 416, 417, 418, 419 are coupled to and are in fluid communication with the recaptured air passage 312. Each air flow director 416, 417, 418, 419 may comprise a separate valve system. In one embodiment, the first air flow director 416 comprises a first vacuum valve opening 717, a first vacuum valve plug 718, a first backflush valve opening 719, a first backflush valve plug 720, a second vacuum valve opening 721, a second vacuum valve plug 722, a second backflush valve opening 723, and a second backflush valve plug 724. The first vacuum valve opening 717 and the second vacuum valve opening 721 are configured such that the vacuum motor 314 is in fluid communication with the first air filter 208 and the second air filter 209, respectively. When the vacuum motor 314 is running and the first vacuum valve opening 717 and the second vacuum valve opening 721 are unimpeded, air is pulled in through the first air filter 208 and the second filter 209 to each filter's interior, through the first vacuum valve opening 717 and the second vacuum valve opening 721, and into the vacuum motor 314. The first vacuum valve opening 717 and the second vacuum valve opening 721 each are configured to have a corresponding vacuum valve plug, the first vacuum valve plug 718 corresponding to the first vacuum valve opening 717 and the second vacuum valve plug 722 corresponding to the second vacuum valve opening 721. The first vacuum valve plug 718 and the second vacuum valve plug 722 are each configured such that they can be selectively positioned to cover and seal the first vacuum valve opening 717 and the second vacuum valve opening 721 respectively, so as to break up the fluid communication between the vacuum motor 314 and the first air filter 208 and the second air filter 209.

In another embodiment, the first backflush valve opening 719 and the second backflush valve opening 723 are coupled to and in fluid communication with the recaptured air passage 312. When the first backflush valve opening 719 and the second backflush valve opening 723 are unimpeded, air from the recaptured air passage 312 is able to flow through the first backflush valve opening 719 and the second backflush valve opening 723 into the interior of the first air filter 208 and the second air filter 209, respectively, and out through the filter media. This movement through the filter media of the first air filter 208 and the second air filter 209 in the reverse direction is the backflushing and dislodges particles and particulate matter that are trapped in the filter media. The first backflush valve plug 720 and the second backflush valve plug 724 are each configured such that they can be selectively positioned to cover and seal the first backflush valve opening 719 and the second backflush valve opening 723 respectively, so as to break up the fluid communication between the recaptured air passage 312 and the first air filter 208 and the second air filter 209.

A further embodiment comprises orientations for normal flow and for backflushing. When each air flow director 416, 417, 418, 419 is in a normal flow orientation, the first vacuum valve opening 717 is unimpeded such that the first vacuum valve plug 718 is not sealing off the first vacuum valve opening 717. In this normal flow orientation, the first backflush valve opening 719 is sealed off by the first backflush valve plug 720, the second vacuum valve opening 721 is unimpeded such that the second vacuum valve plug 722 is not sealing off the second vacuum valve opening 721, and the second backflush valve opening 723 is sealed off by the second backflush valve plug 724. The normal flow orientation allows for the air being sucked into the vacuum system 100, through the first air filter 208 and the second air filter 209 in order to remove particles from the air, through the vacuum motor 314, and out the air exhaust port 207.

An exemplary embodiment provides for the air flow director 416, 417, 418, 419 to be oriented in backflushing orientation. In one non-limiting embodiment, only one of the air flow directors 416, 417, 418, 419 will be oriented in a backflushing orientation at a given moment. For example, when a first air flow director 416 is in the normal flow orientation, a second air flow director 417 is in a backflushing orientation in which the second vacuum valve opening 721 is sealed by the second vacuum valve plug 722 and the second backflush valve plug 724 is positioned distal from the second backflush valve opening 723 such that air is free to travel through the second backflush valve opening 723. After a period of time, the second air flow director 417 could be oriented in the normal flow orientation, and after a second period of time the first air flow director 416 could be oriented in the backflushing orientation, comprising the first vacuum valve opening 717 being sealed by the first vacuum valve plug 718 and the first backflush valve plug 720 being positioned distal from the first backflush valve opening 719 such that air is free to travel through the first backflush valve opening 719. These examples are not limited to these exact descriptions, but could incorporate many more air flow directors and air filters, by way of example.

An exemplary embodiment has the recaptured passage 312 terminating at a terminal end of the recaptured air passage 725 after a last air flow director 419. When all air flow directors 416, 417, 418, 419 are in a normal flow orientation, the only opening to the recaptured air passage 312 is the recaptured air port 603. When the vacuum motor 314 is exhausting air through the air exhaust port 207, exhaust air is being redirected by the air recapturing adapter 313, through the recaptured air port 603 and into the recaptured air passage 312. As a result of the constant flow of air into the recaptured air passage 312 and no outlet when all the air flow directors 416 are in the normal flow orientation, the air within the recaptured air passage 312 becomes pressurized. This pressurized air provides a strong burst or punch of air to the air filters 208, 209, 210, 211 when the air flow directors 416, 417, 418, 419 change from a normal flow orientation to a backflushing orientation. The pressurized air is effective in providing a stronger initial burst of air to air filters 208, 209, 210, 211 in order to dislodge particles that clog the pores of the air filter media.

Another exemplary embodiment provides for the recoupling of the recaptured air passage 312 to the air exhaust port 207 or the air recapturing adapter 313. FIG. 4 provides an illustration of this exemplary embodiment. In this embodiment, the recaptured air passage 312 recouples to the air recapturing adapter 313 downstream from the recaptured air port 603, such that the air that is recaptured is cycled through the recaptured air passage 312 and out the air recapturing adapter 313 when the air flow directors 416 are in a normal flow orientation, thus providing the recaptured air passage 312 with air that is constantly in motion. When one of the air flow directors 416, 417, 418, 419 is reoriented in a backflushing orientation, the constantly moving air is able to move through the air filters 208, 209, 210, 211 with extra force in order to dislodge particles that clog the pores of the air filter media. This is possible because the constantly moving air only needs to change direction and does not have to be accelerated from a stop to the high velocity that is needed to dislodge particles from the air filter media pores.

In another exemplary embodiment, the vacuum motor 314 is providing the force for backflushing the air filters 208, 209, 210, 211 by both pushing air through the air filters in a reverse direction and pulling air through the air filters in a reverse direction. This is accomplished by the arrangement of the various components of the vacuum system 100. When all air flow directors 416 are oriented in the normal flow orientation, air is introduced to the vacuum system 100 through the air inlet port. When the vacuum motor 314 is activated, a low pressure system is created in the vacuum cover 105 and, in turn, in the substantially air tight chamber 108. Because the vacuum motor 314 is in fluid communication with the substantially air tight chamber 108, when a low pressure system is created in the vacuum cover 105, the relatively higher pressure system of the substantially air tight air chamber 108 forces air through the air filters 208, 209, 210, 211 to the vacuum motor 314. Because the substantially air tight chamber 108 has lost air, a lower pressure air system is created in the substantially air tight chamber 108. The relatively higher air pressure system of the outside air is pushed into the substantially air tight chamber 108 through the air inlet port 102. When the first air flow director 416 is later changed to a backflushing orientation, the low pressure system of the vacuum cover 105 cannot receive air through the first air filter 208 because the first vacuum valve opening 717 is closed or sealed. However, because the first backflush valve opening 719 is open and in fluid communication with the substantially air tight chamber 108, relatively higher pressure air from the recaptured air passage 312 is forced through the first air filter 208 into the substantially air tight chamber 108 in a reverse direction. This results in a backflushing of the first air filter 208.

Figure 8:
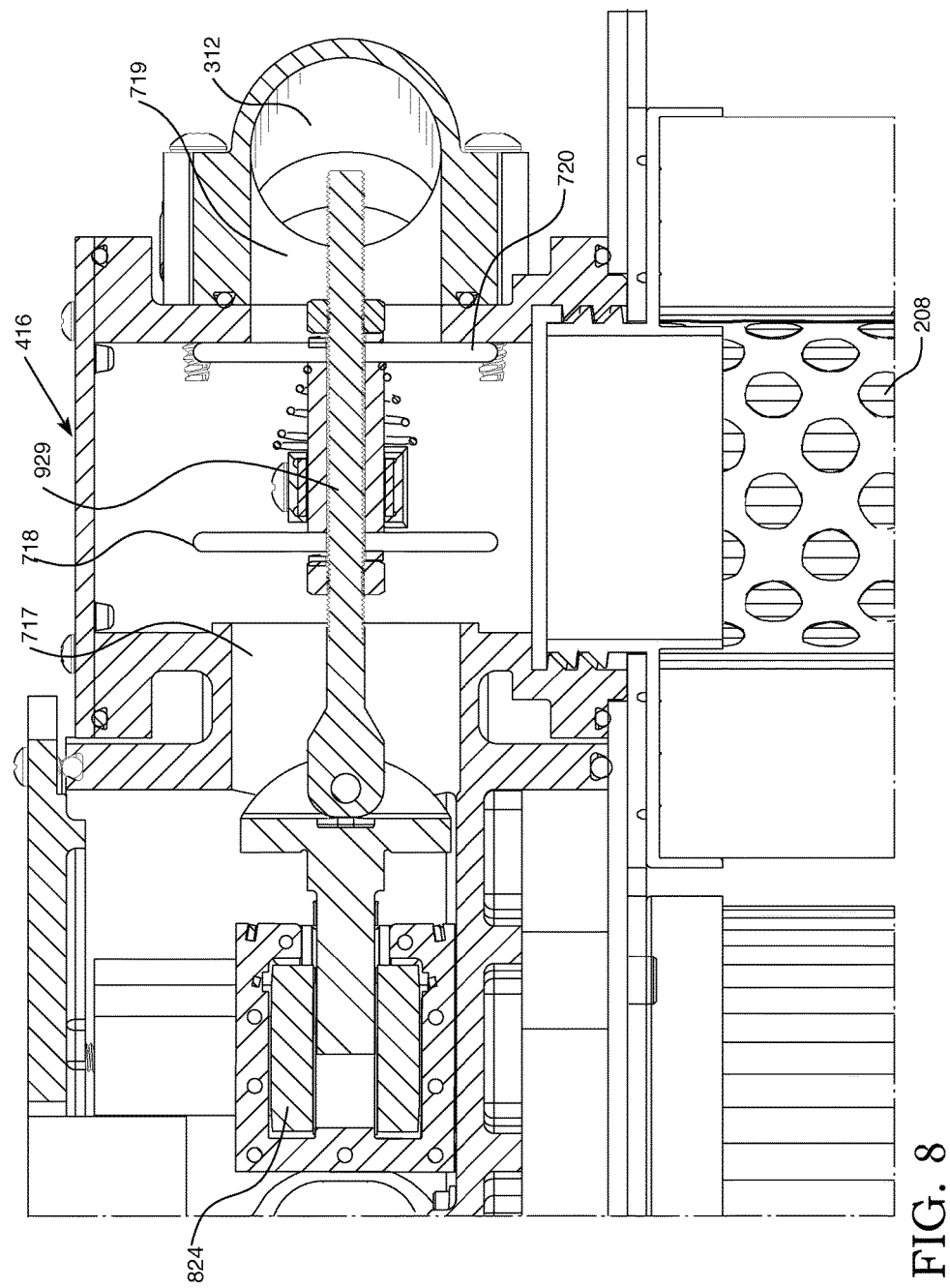
FIG. 8 depicts an implementation of a vacuum valve opening, vacuum valve plug, backflush valve opening, and backflush valve plug.

FIG. 8 is an exemplary embodiment of the configuration of an air flow director 416, 417, 418, 419. In this non-limiting embodiment, the first vacuum valve opening 717 has a corresponding first vacuum valve plug 718 and the first backflush valve opening 719 has a corresponding first backflush valve plug 720. In this embodiment, a shaft 929 is coupled to the first vacuum valve plug 718 and the first backflush valve plug 720. The first vacuum valve plug 718 and the first backflush valve plug 720 are spaced on the shaft 929 such that when the first vacuum valve plug 718 is in contact with and sealing the first vacuum valve opening 717, the first backflush valve plug 720 is positioned distal and away from the first backflush valve opening 719 and air is able to flow freely through the first backflush valve opening 719. Conversely, when the first backflush valve plug 720 is in contact with and sealing the first backflush valve opening 719, the first vacuum valve plug 718 is positioned distal from the first vacuum valve opening 717 and air is able to flow freely through the first vacuum valve opening 717.

It can be appreciated by those of ordinary skill in the art that vacuum valve openings 717, 721 and backflush valve openings of different shapes and sizes could be employed. For example, all the valve openings 717, 719, 721, 723 can all have the same diameter. In another embodiment, the vacuum valve openings 717, 721 could have a larger diameter than the backflush valve openings 719, 723 such that when the air flow directors 416, 417, 418, 419 are oriented in the backflushing orientation air moves more quickly through the backflush valve openings 719, 723 than if all the valve openings 717, 719, 721, 723 were the same diameter. The various shapes and sizes of valve openings 717, 719, 721, 723 could be variously implemented according to the principles of fluid dynamics to achieve various results and the examples given are not intended to be limiting.

FIG. 8 illustrates an exemplary embodiment of an air flow director 416, 417, 418, 419 oriented in the normal flow orientation. FIG. 6 illustrates an exemplary embodiment of one of the air flow directors 416, 417, 418, 419 being in the backflushing orientation and the remaining air flow directors 416, 417, 418, 419 being in the normal flow orientation. In FIG. 6, the first air flow director 416, the third air flow director 418, and the fourth air flow director 419 are oriented in the normal flow orientation and the second air flow director 417 is oriented in the backflush orientation.

Figure 7:
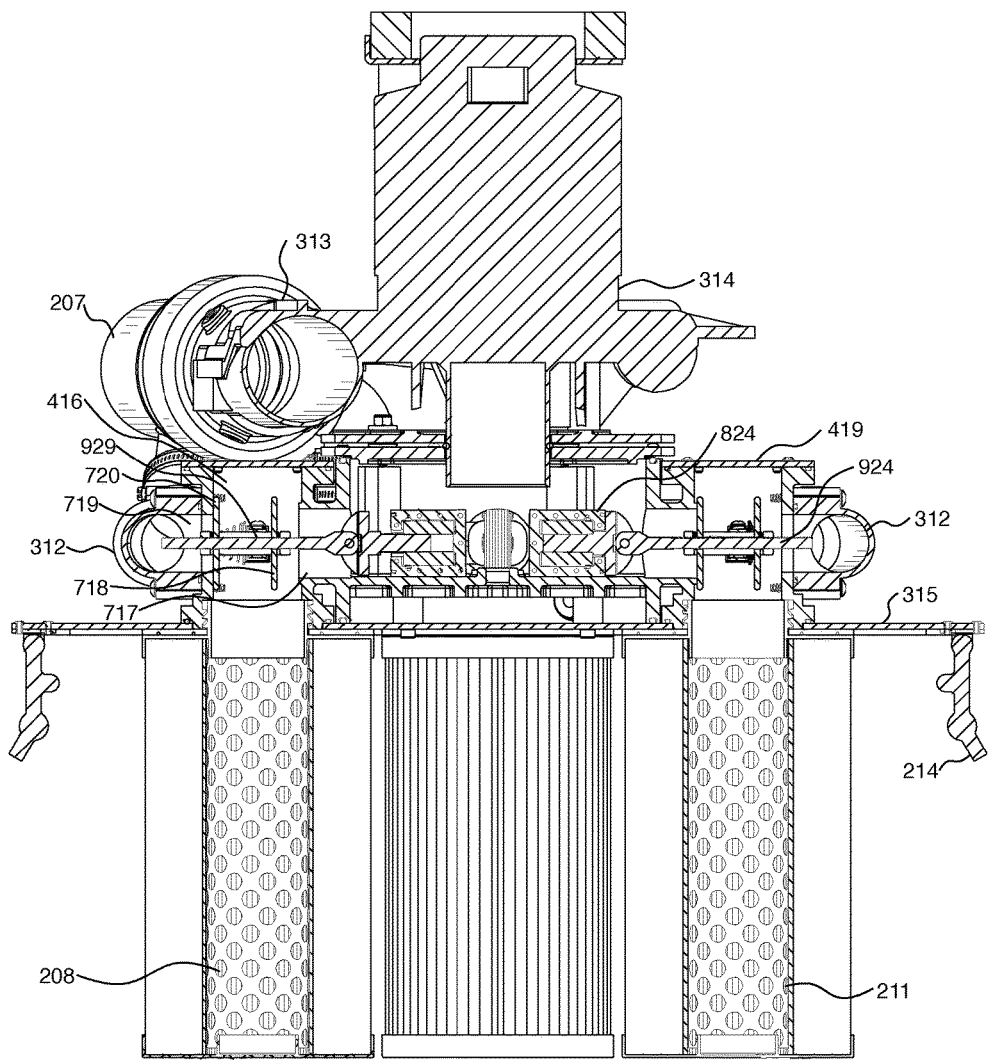
FIG. 7 depicts an implementation of a vacuum motor, air flow directors, air filters, valve openings, and valve plugs.

As seen in FIG. 7, an exemplary method of backflushing a vacuum filter includes, but is not limited to: passing air in a first direction through at least two of the air filters 208, 209, 210, 211, wherein a vacuum motor 314 is configured to pull the air from an air inlet port 102 through the at least two air filters 208, 209, 210, 211; passing the air from the vacuum motor 314 to an air exhaust port 207; recapturing a portion of the air, wherein the portion of the air is recaptured by an air recapturing adapter 313 coupled to the air exhaust port 207; sending the portion of the air to the at least two air filters 208, 209, 210, 211, wherein the portion of the air is channeled through a recaptured air passage 313 in fluid communication with the at least two air filters 208, 209, 210, 211; setting a first air flow director 416 to a backflushing orientation comprising allowing the portion of the air to flow through one of the at least two air filters 208 in a reverse direction for a portion of time, wherein the first air flow director 416 is configured to open a passage to allow fluid communication between the recaptured air passage 312 and the one of the at least two air filters 208; and returning the first air flow director 416 to a normal flow orientation comprising reorienting the first air flow director 416 after the portion of time, wherein the recaptured air passage 312 and the one of the at least two air filters 208 are not in fluid communication. In one exemplary embodiment, orienting the air flow director 416, 417, 418, 419 in the backflushing orientation comprises orienting the vacuum valve plugs 718, 722 such that they cover or seal the vacuum valve openings 717, 721 and the backflush valve plugs 720, 724 are oriented such that they are positioned distal or away from the backflush valve openings 719, 723. When the air flow director 416, 417, 418, 419 is reoriented in a normal flow orientation the vacuum valve plugs 718, 722 are oriented such that they are positioned distal or away from the vacuum valve openings 717, 721 and the backflush valve plugs 720, 724 are oriented such that they cover or seal the backflush valve openings 719, 723, thus causing the recaptured air passage 312 and the air flow director 416, 417, 418, 419 to not be in fluid communication.

In an exemplary embodiment, motors 824 are coupled to the shaft 929, such that the motors 824 control the position and orientation of the valve plugs 718, 720, 722, 724 in relation to the valve openings 717, 719, 721, 723. In some embodiments the motor 824 may comprise solenoids.

In another exemplary embodiment, the air inlet port 102 is positioned such that the air being received into the vacuum generally enters below, or inferior the air filters 208, 209, 210, 211, such that the debris that is received into the substantially air tight chamber 108 does not make contact with or shred the air filters 208, 209, 210, 211. In another embodiment, the air inlet port 102 is positioned such that air and debris entering the substantially air tight chamber 108 enters in a direction substantially parallel to the surrounding wall 101, such that the debris is redirected by the wall incrementally and circles the inner perimeter of the surrounding wall 101. The placement of the air inlet port 102 on the outer edge of the surrounding wall 101 such that the air inlet port 102 and the surrounding wall 101 are substantially parallel or substantially on the same plane prevents the debris from entering the substantially air tight chamber 108 such that it would contact or shred the air filters 208, 209, 210, 211 and redirects the debris in a circular or cyclone pattern preventing bouncing and shattering debris and shrapnel.

In some embodiments, the vacuum system 100 further comprises a controller 106. The controller can be configured to give directions to the air flow directors 416, 417, 418, 419. This allows a programmed function to be performed so as to control the backflushing system of the vacuum system 100. The controller 106 could be configured such that the user can interact with controller in order to achieve specific backflushing arrangements. The controller 106 could include programs that vary the timing of the backflushing system. These programs could include prolonged periods of backflushing, quicker and shorter bursts of backflushing, decreased intervals of backflushing, increased intervals of normal flow operation, etc. These different programs may serve different functions, such as extra-heavy dust accumulation, large particulate dust accumulation, low dust environments, etc.

It can be appreciated that there are various other designs and methods that can be implemented to achieve the goals of this system and method, and the terms employed in this description are given as examples are not limiting so as to exclude alternate embodiments that could be employed to achieve the goals and inventive aspects of the disclosed invention. The embodiments recited above are given only as examples and are to be construed as such.

I claim:

1. A vacuum cleaner filter backflushing system comprising:
   a vacuum motor;
   an air inlet port in fluid communication with the vacuum motor;
   at least two air filters in fluid communication with the air inlet port and the vacuum motor and positioned between the air inlet port and the vacuum motor;
   an air exhaust port in fluid communication with the vacuum motor, wherein the vacuum motor is positioned between the air inlet port and the air exhaust port;
   an air recapturing adapter pipe connected to the air exhaust port, wherein the air recapturing adapter pipe is further connected to a recaptured air passage conduit, wherein:
   the recaptured air passage conduit is connected to an air flow director valve system, wherein during operation, a portion of exhaust air is directed from the air exhaust port and into the air recapturing adapter pipe where the portion of exhaust is then transferred into the recaptured air passage conduit and into the air flow director valve system configured to direct the portion of exhaust air towards one of the at least two air filters to provide backflushing gas so as to clean the one of the at least two air filters.

2. The vacuum cleaner filter backflushing system of claim 1, wherein the air flow director valve system comprises a first valve system corresponding to a first air filter of the at least two air filters and a second valve system corresponding to a second air filter of the at least two air filters.

3. The vacuum cleaner filter backflushing system of claim 2, wherein the first valve system comprises:
   a first vacuum valve opening configured to allow fluid communication between the vacuum motor and the first air filter;
   a first backflush valve opening configured to allow fluid communication between the recaptured air passage and the first air filter;
   a first vacuum valve plug configured to close the first vacuum valve opening; and a
   first backflush valve plug configured to close the first backflush valve opening; and
   the second valve system comprises:
   a second vacuum valve opening configured to allow fluid communication between the vacuum motor and the second air filter;
   a second backflush valve opening configured to allow fluid communication between the recaptured air passage and the second air filter;
   a second vacuum valve plug configured to close the second vacuum valve opening; and
   a second backflush valve plug configured to close the second backflush valve opening.

4. The vacuum cleaner filter backflushing system of claim 3, wherein the first valve system and the second valve system are configured to be oriented in a normal flow orientation, wherein:
   the first backflush valve plug is in contact with the first backflush valve opening so that the first backflush valve opening is sealed shut and the first vacuum valve plug is positioned distal from the first vacuum valve opening so that the first vacuum valve opening allows fluid communication between the vacuum motor and the first air filter when in the normal flow orientation; and
   the second backflush valve plug in contact with the second backflush valve opening so that the second backflush valve opening is sealed shut and the second vacuum valve plug is positioned distal from the second vacuum valve opening so that the second vacuum valve opening allows fluid communication between the vacuum motor and the second air filter when in the normal flow orientation.

5. The vacuum cleaner filter backflushing system of claim 4, wherein the first valve system is configured to be intermittently oriented in a backflushing orientation, wherein the first vacuum valve plug is in contact with the first vacuum valve opening so that the first vacuum valve opening is sealed shut and the first backflush valve plug is positioned distal from the first backflush valve opening and the first backflush valve opening maintains fluid communication between the recaptured air passage and the first air filter when in the backflushing orientation.

6. The vacuum cleaner filter backflushing system of claim 4, wherein the second valve system is configured to be intermittently oriented in a backflushing orientation, wherein the second vacuum valve plug is in contact with the second vacuum valve opening so that the second vacuum valve opening is sealed shut and the second backflush valve plug is positioned distal from the second backflush valve opening and the second backflush valve opening maintains fluid communication between the recaptured air passage and the second air filter when in the backflushing orientation.

7. The vacuum cleaner filter backflushing system of claim 4, wherein the first valve system and the second valve system are configured to intermittently be oriented in a backflushing orientation, wherein:
   when the first valve system is in the backflushing orientation:
   the first vacuum valve plug is in contact with the first vacuum valve opening so that the first vacuum valve opening is sealed shut and the first backflush valve plug is positioned distal from the first backflush valve opening and the first backflush valve opening maintains fluid communication between the recaptured air passage and the first air filter when in the backflushing orientation; and
   the second valve system is in the normal flow orientation; and
   when the second valve system is in the backflushing orientation:
   the second vacuum valve plug is in contact with the second vacuum valve opening so that the second vacuum valve opening is sealed shut and the second backflush valve plug is positioned distal from the second backflush valve opening and the second backflush valve opening maintains fluid communication between the recaptured air passage and the second air filter when in the backflushing orientation; and the first valve system is in the normal flow orientation.

8. The vacuum cleaner filter backflushing system of claim 7, further comprising a controller configured to intermittently position the first valve system and the second valve system between the backflushing orientation and the normal flow orientation.

9. The vacuum cleaner filter backflushing system of claim 2, wherein the recaptured air passage terminates after a last valve of the valve systems.

10. The vacuum cleaner filter backflushing system of claim 2, wherein the recaptured air passage is recoupled to the air exhaust port downstream from the air recapturing adapter.

\* \* \* \* \*